United States Patent
Kung et al.

(10) Patent No.: US 11,425,029 B2
(45) Date of Patent: Aug. 23, 2022

(54) INTERNAL NETWORK MONITORING SYSTEM AND METHOD

(71) Applicant: QNAP SYSTEMS, INC., New Taipei (TW)

(72) Inventors: Hua-Chung Kung, New Taipei (TW); Shih-Chan Huang, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 54 days.

(21) Appl. No.: 16/919,132

(22) Filed: Jul. 2, 2020

(65) Prior Publication Data
US 2021/0176164 A1 Jun. 10, 2021

Related U.S. Application Data

(60) Provisional application No. 62/945,938, filed on Dec. 10, 2019.

(51) Int. Cl.
| | | |
|---|---|---|
| *H04L 45/00* | (2022.01) | |
| *H04L 67/1095* | (2022.01) | |
| *H04L 69/22* | (2022.01) | |
| *H04L 45/74* | (2022.01) | |
| *H04L 47/12* | (2022.01) | |

(52) U.S. Cl.
CPC .............. *H04L 45/22* (2013.01); *H04L 45/74* (2013.01); *H04L 47/12* (2013.01); *H04L 67/1095* (2013.01); *H04L 69/22* (2013.01)

(58) Field of Classification Search
CPC ....... H04L 45/22; H04L 45/24; H04L 45/243; H04L 45/247; H04L 45/74; H04L 47/12; H04L 67/1095; H04L 69/22; H04L 69/324; H04L 67/535; H04L 67/563
See application file for complete search history.

(56) References Cited

U.S. PATENT DOCUMENTS

| | | | | |
|---|---|---|---|---|
| 8,402,540 B2 * | 3/2013 | Kapoor | ................. | H04L 67/327 709/224 |
| 8,565,108 B1 * | 10/2013 | Marshall | ................. | H04L 63/20 709/224 |

(Continued)

FOREIGN PATENT DOCUMENTS

TW 201501487 1/2015

OTHER PUBLICATIONS

Awatef et al., "DoS Attack Prevention on IPS SDN Networks", Oct. 1, 2019, IEEE, 2019 Workshop on Communication Networks and Power Systems (WCNPS) (pp. 1-7) (Year: 2019).*

(Continued)

*Primary Examiner* — Davoud A Zand
(74) *Attorney, Agent, or Firm* — WPAT, PC

(57) ABSTRACT

In an internal network monitoring method for monitoring an internal network, a specified network packet, which is scheduled to be transmitted via a specified path, is inspected. A packet characteristic is extracted from a data link layer of the specified network packet. The specified network packet is directly transmitted via the specified path if the packet characteristic does not comply with a preset condition. The specified network packet is redirected to be transmitted via another path different from the specified path or mirroring the specified network packet to create a mirror packet if the packet characteristic complies with the preset condition.

18 Claims, 11 Drawing Sheets

(56) References Cited

U.S. PATENT DOCUMENTS

| | | | |
|---|---|---|---|
| 9,591,025 B2 | 3/2017 | Hsiung et al. | |
| 2003/0086422 A1* | 5/2003 | Klinker | H04L 29/06 370/389 |
| 2003/0126501 A1* | 7/2003 | Musman | H04L 41/16 714/26 |
| 2007/0056028 A1* | 3/2007 | Kay | H04L 63/1416 726/11 |
| 2011/0209196 A1* | 8/2011 | Kennedy | H04L 63/101 726/1 |
| 2014/0047503 A1* | 2/2014 | Marshall | H04L 63/20 726/1 |
| 2015/0007254 A1* | 1/2015 | Hsiung | H04L 63/20 726/1 |

OTHER PUBLICATIONS

Taiwan Intellectual Property Office, "Office Action", dated Feb. 26, 2021.

\* cited by examiner

US 11,425,029 B2

INTERNAL NETWORK MONITORING SYSTEM AND METHOD

CROSS-REFERENCE TO RELATED APPLICATIONS

The present application is a nonprovisional application claiming benefit from a prior-filed provisional application bearing a Ser. No. 62/945,938 and filed Dec. 10, 2019, the entities of which are incorporated herein for reference.

FIELD OF THE INVENTION

The present invention relates to network security management, and more particularly to an internal network monitoring method and an internal network monitoring system for network security management.

BACKGROUND OF THE INVENTION

In a modern society where network communication is more and more active, data security is an important issue to be seriously considered. For protecting data from being arbitrarily accessed, firewalls are commonly used at many key network nodes to analyze network packets and prohibit suspect network packets from incoming and outgoing network traffic. It is understood that it would take a lot of processing time to detect the contents of the network packets one by one. Therefore, in practice, firewalls are only used to block suspect internet packets, but rarely used to screen packets on internal nets in consideration of data transmission rates. Consequently, there might exist data security threats.

SUMMARY OF THE INVENTION

Therefore, the present invention provides an internal network monitoring method for data security management. The method monitors certain contents of network packets and conditionally activates packet inspection so as to minimize influence on the data transmission rate.

The present invention further provides an internal network monitoring system for data security management.

In accordance with an aspect of the present invention, an internal network monitoring method for monitoring an internal network comprises: inspecting a specified network packet, which is scheduled to be transmitted via a specified path; extracting a packet characteristic from a data link layer of the specified network packet; directly transmitting the specified network packet via the specified path if the packet characteristic does not comply with a preset condition; and redirecting the specified network packet to be transmitted via another path different from the specified path or mirroring the specified network packet to create a mirror packet if the packet characteristic complies with the preset condition.

In accordance with another aspect of the present invention, an internal network monitoring system comprises: a network fire switch including a first network connection port, which monitors a specified network packet transmitted from a first internal network to the first network connection port. The network fire switch inspects a specified network packet, which is scheduled to be transmitted via a specified path, extracts a packet characteristic from a data link layer of the specified network packet; directly transmits the specified network packet via the specified path if the packet characteristic does not comply with a preset condition; and redirects the specified network packet to be transmitted via another path different from the specified path or mirroring the specified network packet to create a mirror packet if the packet characteristic complies with the preset condition.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
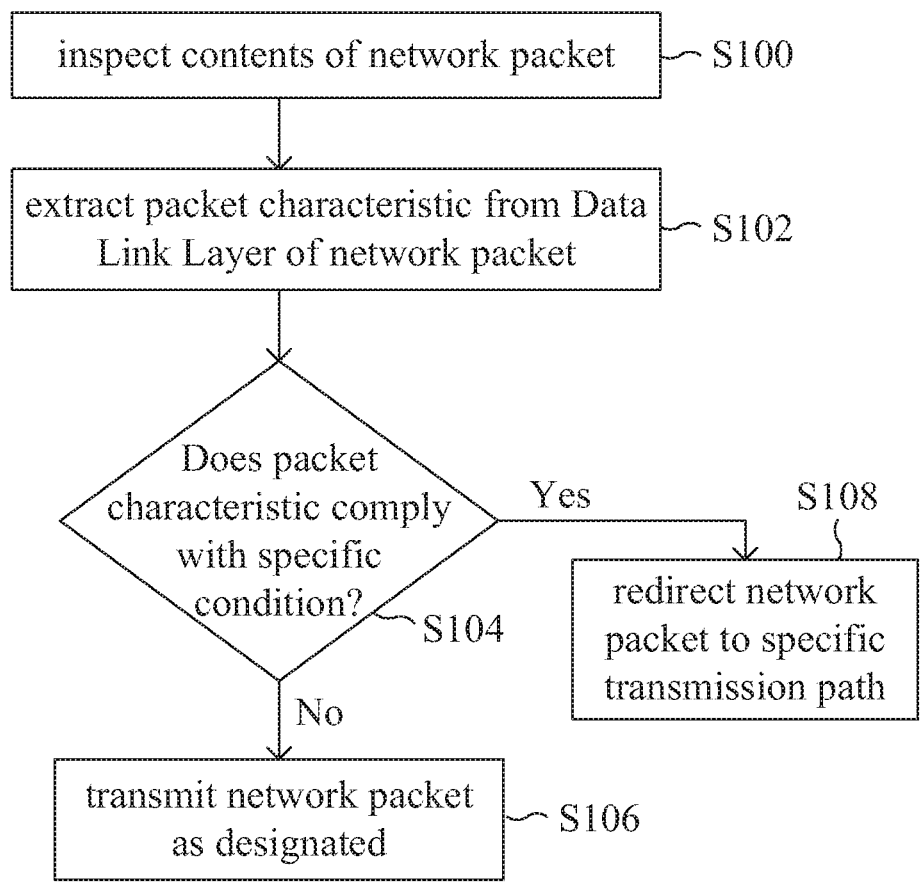
FIG. 1A is a schematic flowchart of an internal network monitoring method according to an embodiment of the present invention.

Please refer to FIG. 1A and FIG. 2, wherein FIG. 1A illustrates a flowchart of an internal network monitoring method according to an embodiment of the present invention, and FIG. 2 is a functional block diagram of an internal network monitoring system according to an embodiment of the present invention. In this embodiment, the internal network monitoring system is implemented with a network fire switch 20. The network fire switch 20 includes a monitoring device 200, a firewall device 210 and a plurality of connection ports 220, 222, 224 and 226. When the network fire switch 20 receives a network packet via a specified one of the connection ports, e.g. the port 226, in Step S100, the network packet is transferred to the monitoring device 200 along a path 230. Meanwhile, the monitoring device 200 inspects contents of the Data Link Layer, i.e. Layer 2, of the network packet (Step S104) to extract a packet characteristic of the network packet.

Figure 2A:
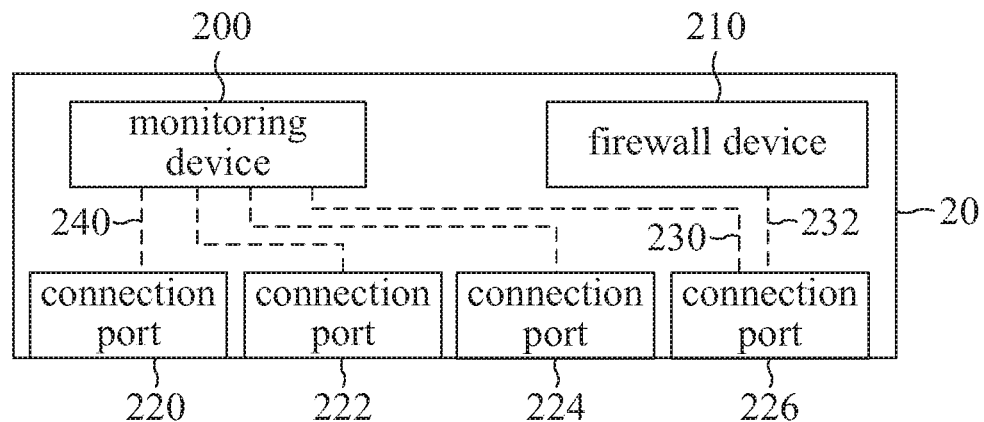
FIG. 2A is a functional block diagram schematically illustrating a network fire switch according to an embodiment of the present invention.
Figure 2B:
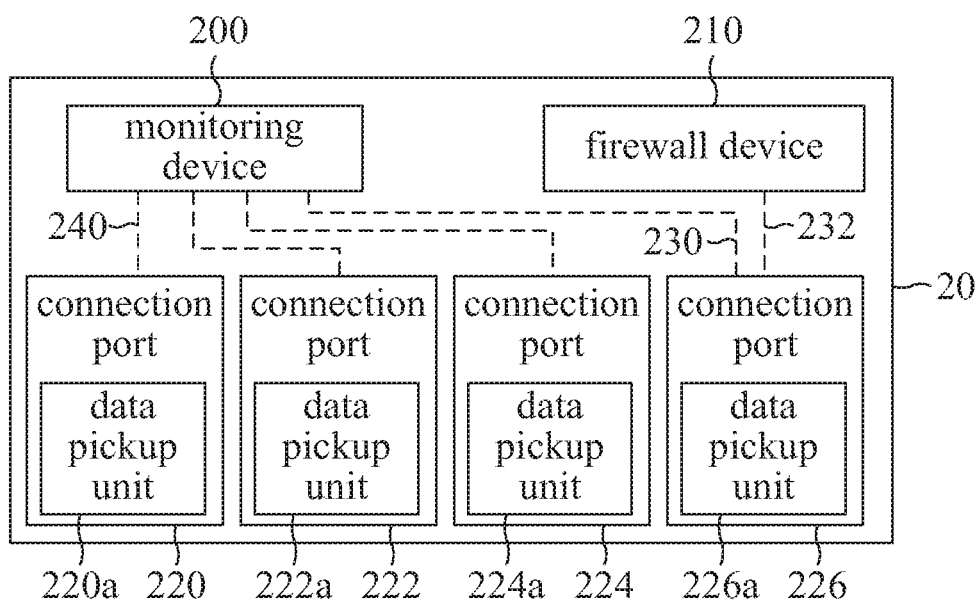
FIG. 2B is a functional block diagram schematically illustrating a network fire switch according to another embodiment of the present invention.

In the embodiment shown in FIG. 2A, the monitoring device 200 directly accesses the network packets received via the connection ports 220-226. Alternatively, additional data pickup units 220a, 222a, 224a and 226a may be installed in each of the connection ports 220-226, respectively, for temporarily storing network packets and extracting the packet characteristics of the received network packets, as illustrated in FIG. 2B. The monitoring device 200 is coupled to the data pickup units 220a, 222a, 224a and 226a and analyzes the packet characteristics of the network packets stored in the data pickup units 220a, 222a, 224a and/or 226a.

Based on the analyzed packet characteristics, the monitoring device 200 determines whether each of the packet characteristics is on a preset specific condition (Step S104). If any of the packet characteristics is not on the specific condition, the corresponding network packet will be directly transmitted to a predetermined target address via a predetermined path, e.g. Path 240 shown in FIG. 2A (Step S106). On the other hand, a network packet with a packet characteristic complying with the specific condition will be redirected and transmitted to the firewall device 210 (Step S108).

Figure 1B:
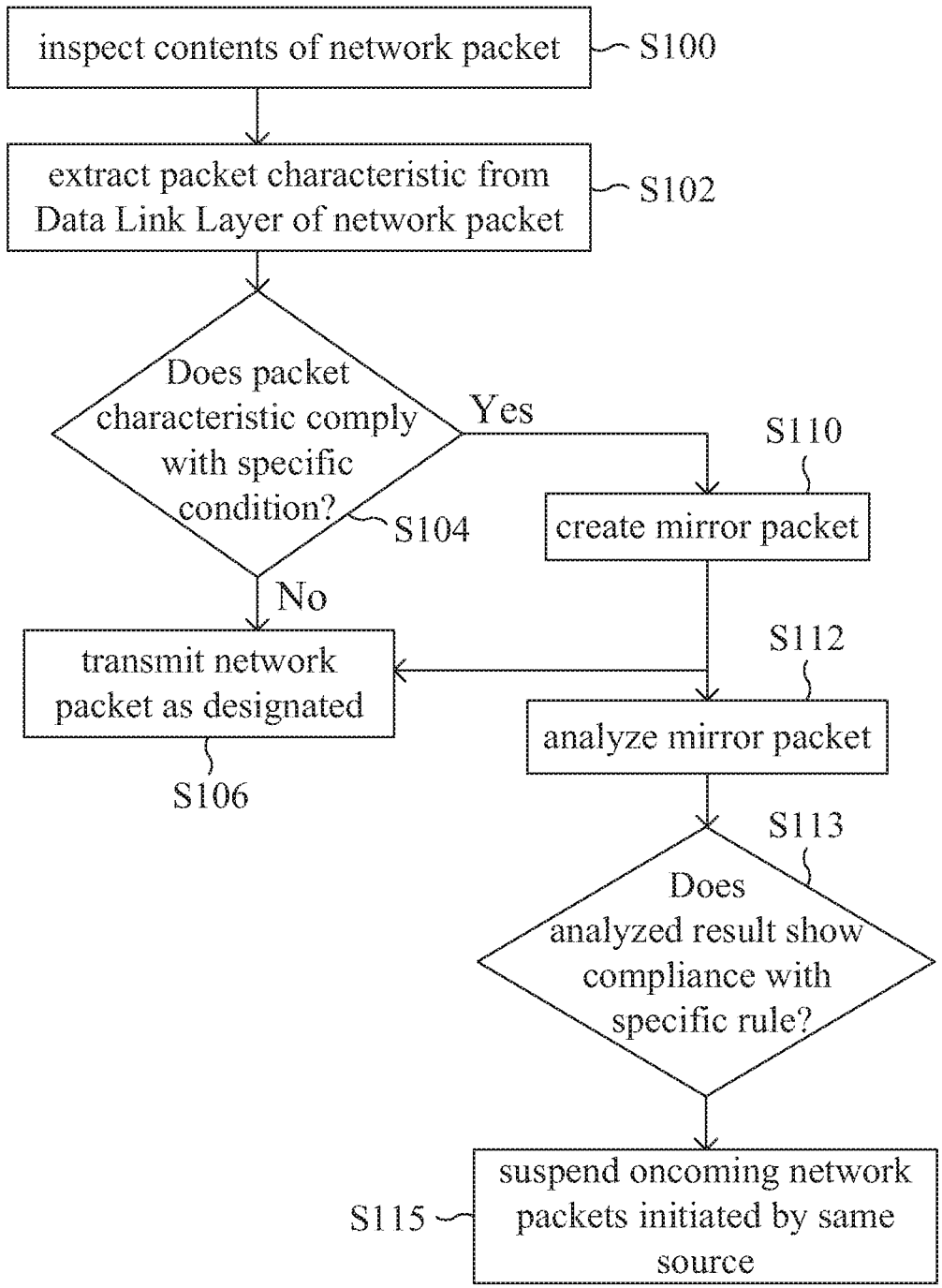
FIG. 1B is a schematic flowchart of an internal network monitoring method according to another embodiment of the present invention.

Another embodiment of internal network monitoring method according to the present invention will be described hereinafter with reference to the flowchart of FIG. 1B and the hardware construction of FIG. 2A or 2B. As shown in FIG. 1B, the steps from Step S100 through Step S106 are substantially the same as those described with reference to FIG. 1A, which will not be repeatedly described herein. In this embodiment, once a network packet received via one of the connection ports 220-226 or accessed from the data pickup units 220a, 222a, 224a or 226a is determined to have a packet characteristic complying with the preset specific condition in Step S104, a mirroring operation will be performed to process the network packet into a mirror packet (Step S110). The mirror packet is then transmitted to the firewall device 210 to be analyzed (Step S112). Meanwhile, the original network packet is transmitted to the predetermined target address (Step S106). The firewall device 210 inspects the contents of the analyzed mirror packet, and suspends oncoming network packets originating from the same source (Step S115) if the analyzed result shows that the packet includes contents which meet a specific rule (Step S113). On the other hand, the transmission of network packets will not be interrupted if the analyzed result shows no suspicious contents.

Figure 3:
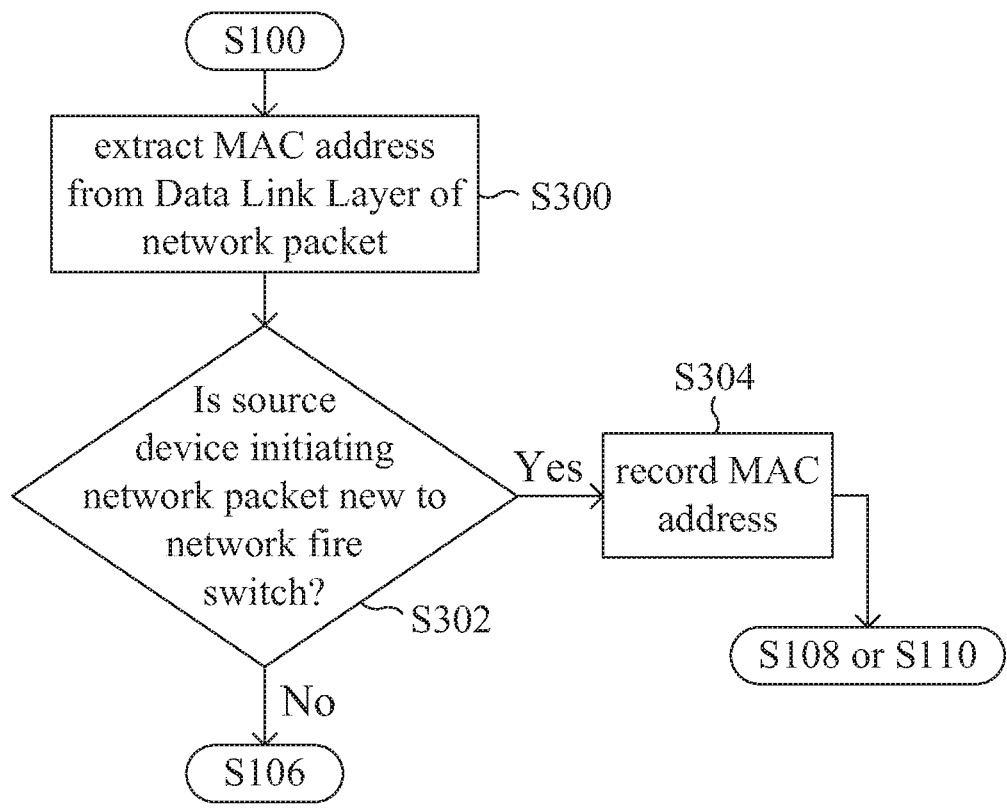
FIGS. 3, 4, 5A-5D and 6 are practical examples to execute the embodiments of internal network monitoring methods according to the present invention.

It is understood that the packet characteristic defined in Step S102 and the specific condition used in Step S104 of FIG. 1A or FIG. 1B for discriminating a network packet may vary with technical designs and/or practical requirements. FIG. 3 gives examples of the packet characteristic and the specific condition for executing Step S102 and Step S104 of the internal network monitoring method. For example, the packet characteristic is or includes a network address, e.g. MAC (Media Access Control) address, of a network packet, and the specific condition is or includes a connection status to a new source. After the monitoring device 200 receives a network packet (Step S100), a network address is extracted from the data link layer of the network packet as the packet characteristic (Step S300). Based on the network address, it is determined whether the source device initiating the network packet is a new one or not (Step S302). For example, the monitoring device 200 searches the extracted network address in a database (not shown) of the network fire switch 20, and determines that the source is a new one if no record can be located in the database. The method will proceed to Step S106, i.e. directly transmitting the network packet to a predetermined target address via a predetermined path, when the source is not a new one. On the contrary, if the source is determined to be a new one in Step S302, the monitoring device 200 will record the network address into the database of the network fire switch 20 (Step S304) for subsequent comparing reference, and meanwhile, redirect the transmission path of the network packet (FIG. 1A, Step S108) or further inspect the network packet, for example by way of mirroring the network packet (FIG. 1B, Step S110).

Figure 4:
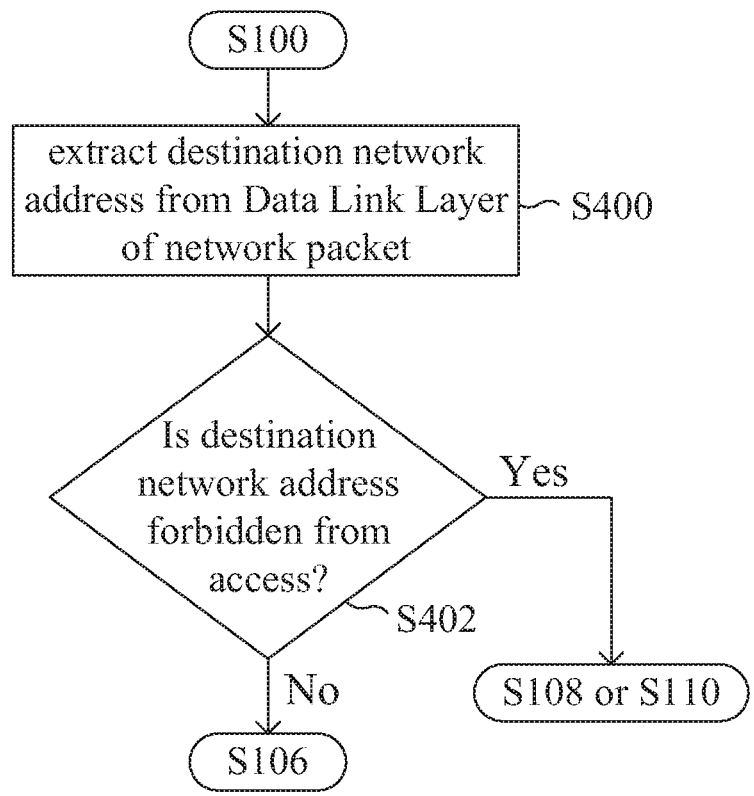

Please refer to FIG. 4, in which other examples of the packet characteristic and the specific condition for executing Step S102 and Step S104 of the internal network monitoring method according to the present invention are given. The packet characteristic defined in this example is or includes a destination network address of the network packet, and the specific condition is or includes an access status of the destination network address. After the monitoring device 200 receives a network packet (Step S100), a destination network address is extracted from the data link layer of the network packet as the packet characteristic (Step S400). Based on the destination network address, it is determined whether the device that the destination network address is directed to is forbidden from access or not (Step S402). For example, the monitoring device 200 searches the extracted destination network address in a database (not shown) of the network fire switch 20 to see if the device that the destination network address is a forbidden device on the record. The method will proceed to Step S106, i.e. directly transmitting the network packet to a predetermined target address via a predetermined path, if the network packet is not supposed to be restricted from access. On the contrary, if the destination network address shows the network packet is a restricted one in Step S402, the monitoring device 200 will redirect the transmission path of the network packet (FIG. 1A, Step S108) or further inspect the network packet, for example by way of mirroring the network packet (FIG. 1B, Step S110).

Figure 5A:
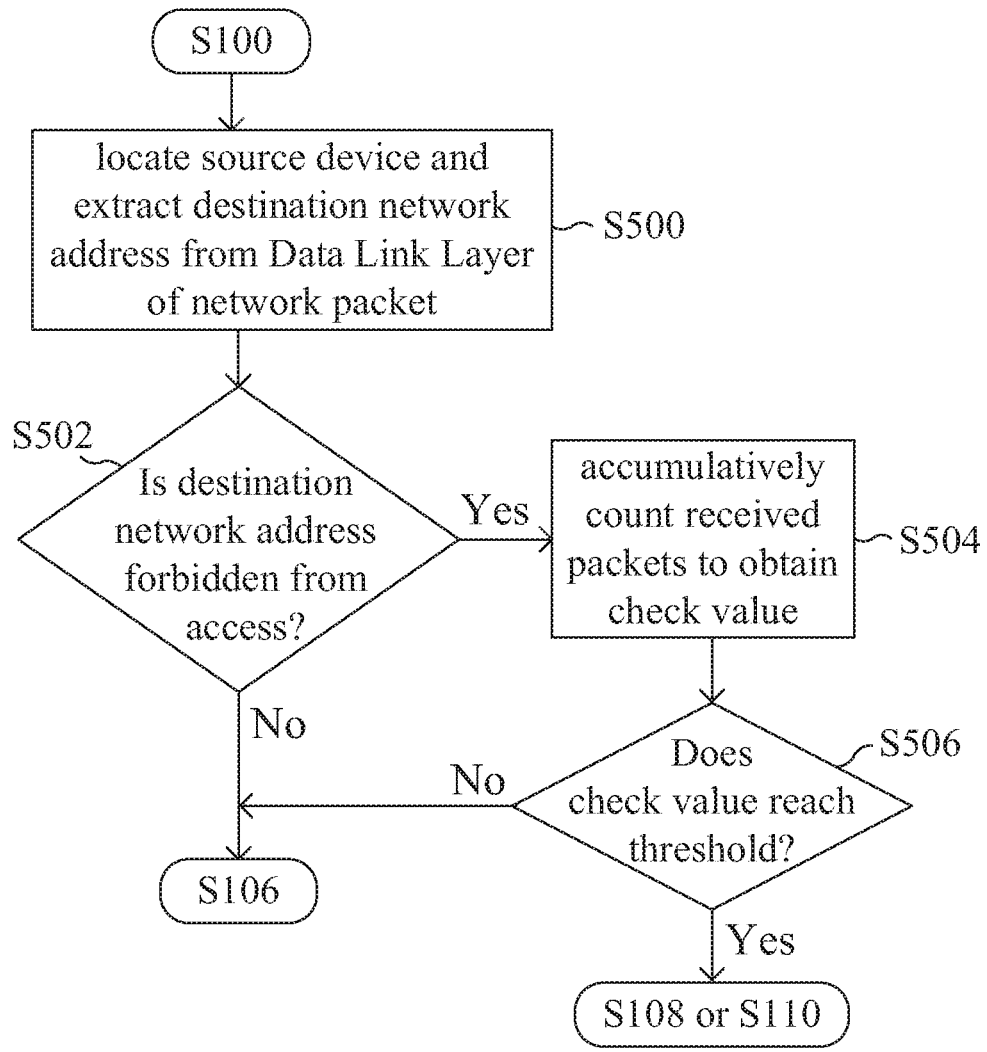

FIG. 5A illustrates further examples of the packet characteristic and the specific condition for executing Step S102 and Step S104 of the internal network monitoring method according to the present invention. In this embodiment, both a source device initiating the network packet is located and the destination network address of the network packet is extracted by the monitoring device 200 (Step S500). Then the monitoring device 200 searches the destination network address in the database of the network fire switch 20 to see if the device that the destination network address is directed to is a forbidden device (Step S502). If the destination device is not on the record, proceed to Step S106 to have the network packet directly transmitted to the destination device via the predetermined path. On the contrary, if the destination device is a forbidden one on the record, the monitoring device 200 accumulatively calculates a count of packets to be transmitted from the source device to the destination device, and records the count as a check value (Step S504). When the monitoring device 200 determines the check value has reached a preset value in Step S506, the monitoring device 200 will redirect the transmission path of the network packet (FIG. 1A, Step S108) or further inspect the network packet, for example by way of mirroring the network packet (FIG. 1B, Step S110). Before the preset value is reached, the network packets can still be transmitted to the destination device via the predetermined path.

Figure 5B:
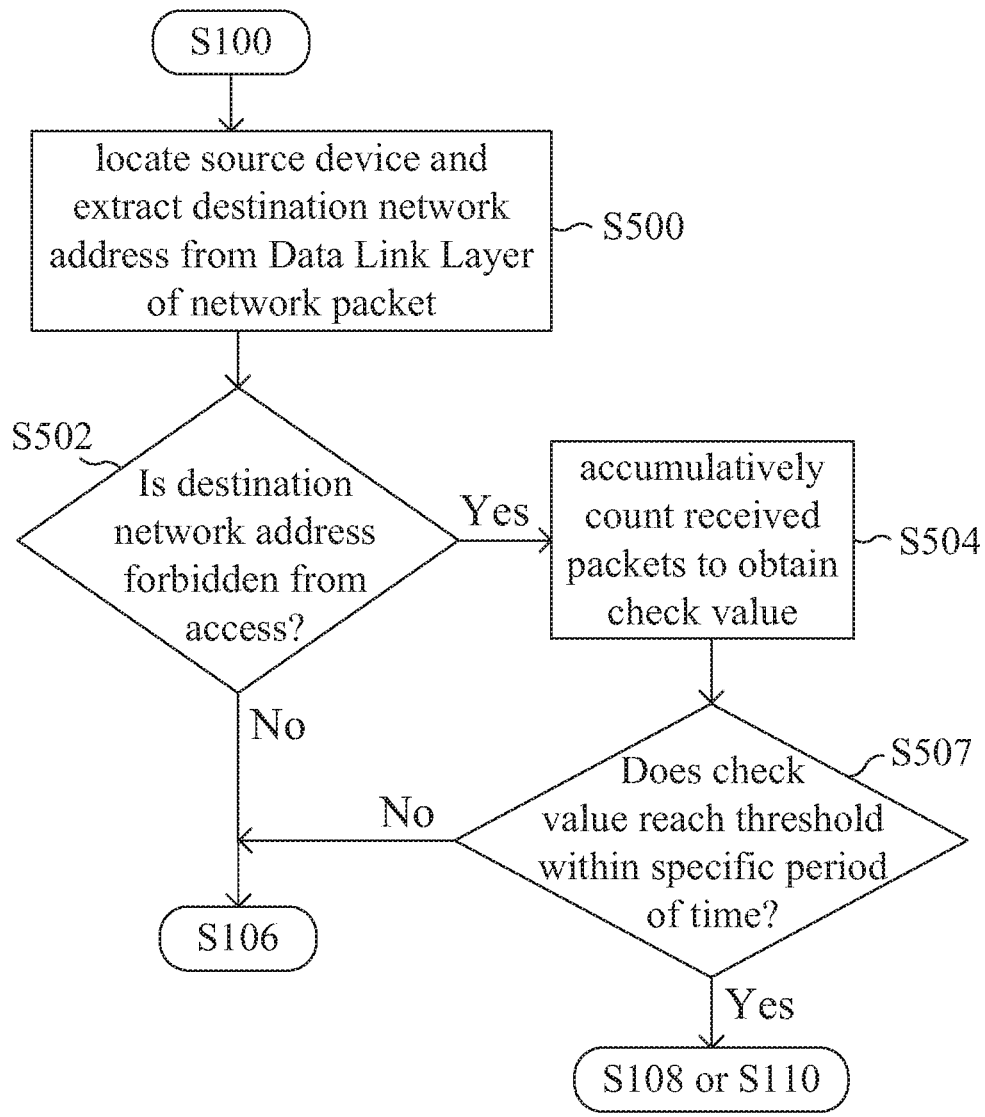

Alternatively, a time factor may be added to the discriminating operation for inspecting the network packets, as shown in FIG. 5B, Step S507. That is, the monitoring device 200 determines if the check value has reached a preset value within a preset period of time, e.g. 10 seconds or 1 minute. If the check value has not reached the preset value within the preset period of time, proceed to Step S106. On the contrary, once the check value has reached the preset value before the period of time is due, proceed to Step S108 or S110. It is understood that the period of time can be preset and adjusted according to practical requirements.

Figure 5C:
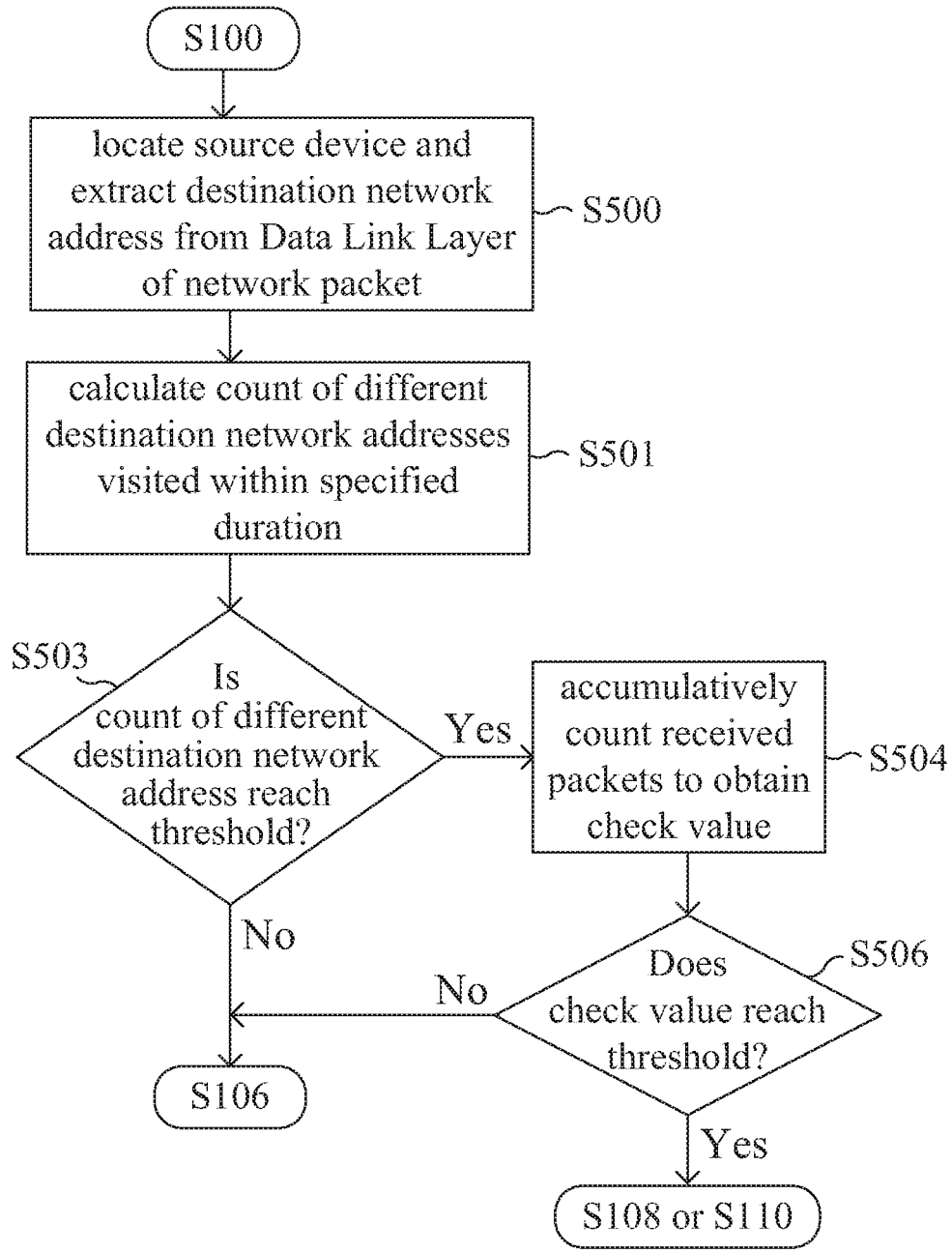

FIG. 5C schematically illustrates an alternative example of specific condition for executing Step S104 of the internal network monitoring method according to the present invention. After the source device initiating the network packet is located according to the network address and the destination network address of the network packet is extracted by the monitoring device 200 in Step S500, a count of different destination network addresses that the source device visits within a specified duration is calculated (Step S501), and whether the count reaches a threshold is determined (Step S503). When the count reaches the threshold, it is determined that the specific condition is complied with, so Step S108 is executed to redirect the network packet.

Figure 5D:
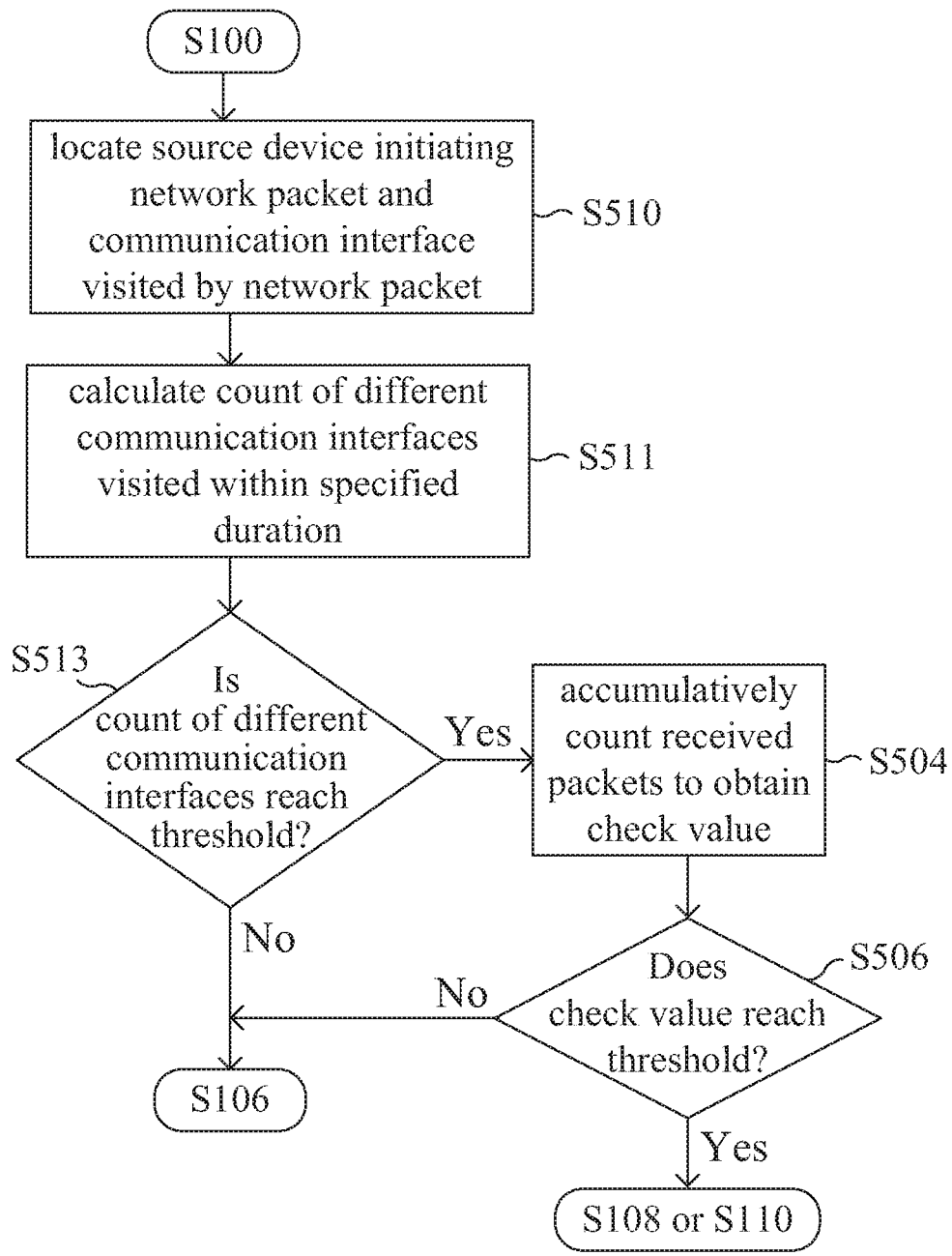

FIG. 5D illustrates further examples of the packet characteristic and the specific condition for executing Step S102 and Step S104 of the internal network monitoring method according to the present invention. In this embodiment, both a source device initiating the network packet and a communication interface to be visited by the network packet are realized as the packet characteristic (Step S510). A count of different communication interfaces that the network packets initiated by the source device visit within a specified duration is calculated (Step S511), and whether the count reaches a threshold is determined (Step S513). When the count reaches the threshold, it is determined that the specific condition for dealing with upcoming network packets is complied with, so Step S108 is executed to redirect the network packet.

Figure 6:
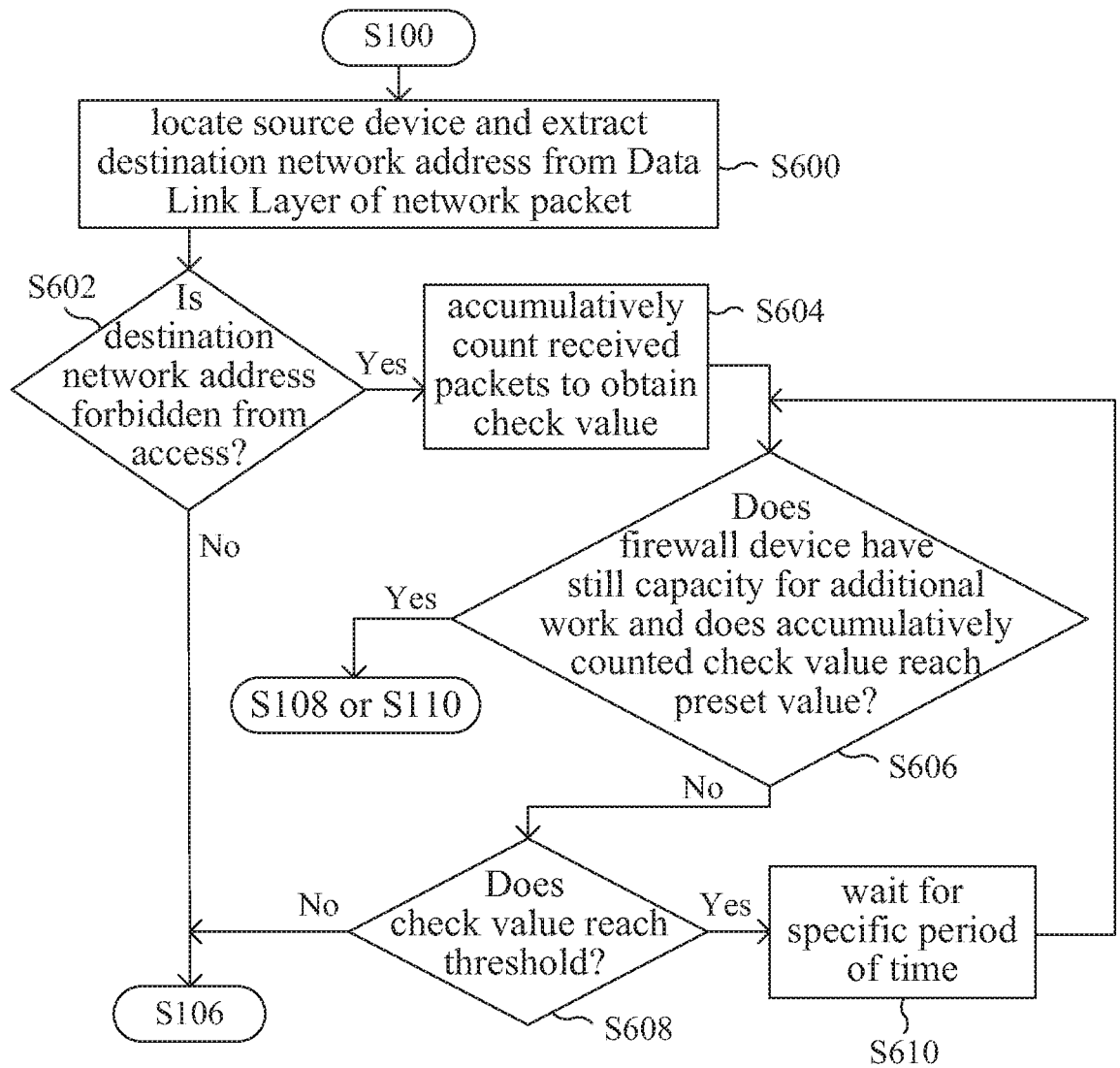

In any of the above embodiments, workload of the firewall device 210 may be additionally taken into consideration for further improving the efficiency of the system. For example, FIG. 6 illustrates a flowchart of an internal network monitoring method, which is similar to the one illustrated with reference to FIG. 5A, while additional steps associated with the workload of the firewall device 210 are included. In this embodiment, Steps S600, S602 and S604 are similar to Steps S500, S502 and S504, and not redundantly described herein. After Step S604, in which an accumulatively counted check value is obtained, the monitoring device 200 checks workload of the firewall device 210 to see if the firewall device 210 has still capacity for additional work when the accumulatively counted check value has reached the preset value (Step S606). If the accumulatively counted check value has reached the preset value and the firewall device 210 has still capacity for additional work, proceed to Step S108 or Step S110 to have the firewall device 210 process the network packets. On the other hand, if the accumulatively counted check value has reached the preset value and/or the firewall device 210 has still capacity for additional work, proceed to Step S608 to specify whether the accumulatively counted check value has reached the preset value or not. If not yet, proceed to Step S106 to have the network packet transmitted as scheduled. On the contrary, if the accumulatively counted check value has reached the preset value, proceed to Step S610 to wait for a period of time and then proceed to Step S606 to check the state of the firewall device 210 again.

It is understood that the preset value that the accumulative counted check value is to be compared with may be one or more than one. Depending on practical requirement, different types of network packets may be treated differently. For example, for specific types of network packets, the preset value is set to be one, while the preset value is set to be more than one for common types of network packets. When the preset value is one, it means that such kind of network packets, even occurring just once, would require the firewall device 210 to specifically deal with. It is to be noted that the above-mentioned parameters for discrimination such as the condition, rule and check value are for illustration only, and can be designed or selected based on practical requirements. For example, when data traffic between the source device and the destination device is concerned, the packet characteristic and the specific condition may be specifically designed to reflect the traffic situation.

When the monitoring device 200 determines that the network packet should be transmitted to the firewall device 210 to be processed, the network packet received from or temporarily stored in the connection port, e.g. the connection port 226, or its mirror packet is transmitted to the firewall device 210 via Path 232, as shown in FIG. 2A or 2B. Then the firewall device 210 determines whether the network packet meets an alarm rule, i.e. the specific rule described in Step S113 of FIG. 1B. Once the network packet meets the alarm rule, the firewall device 210 conducts a predetermined operation in response. For example, the firewall device 210 issues an alarm signal to inform of a control center, actively restricts the transmission rate of the network path where the network packet is transmitted, or directly interrupts the transmission path of the network packet where the network packet is transmitted.

Figure 7:
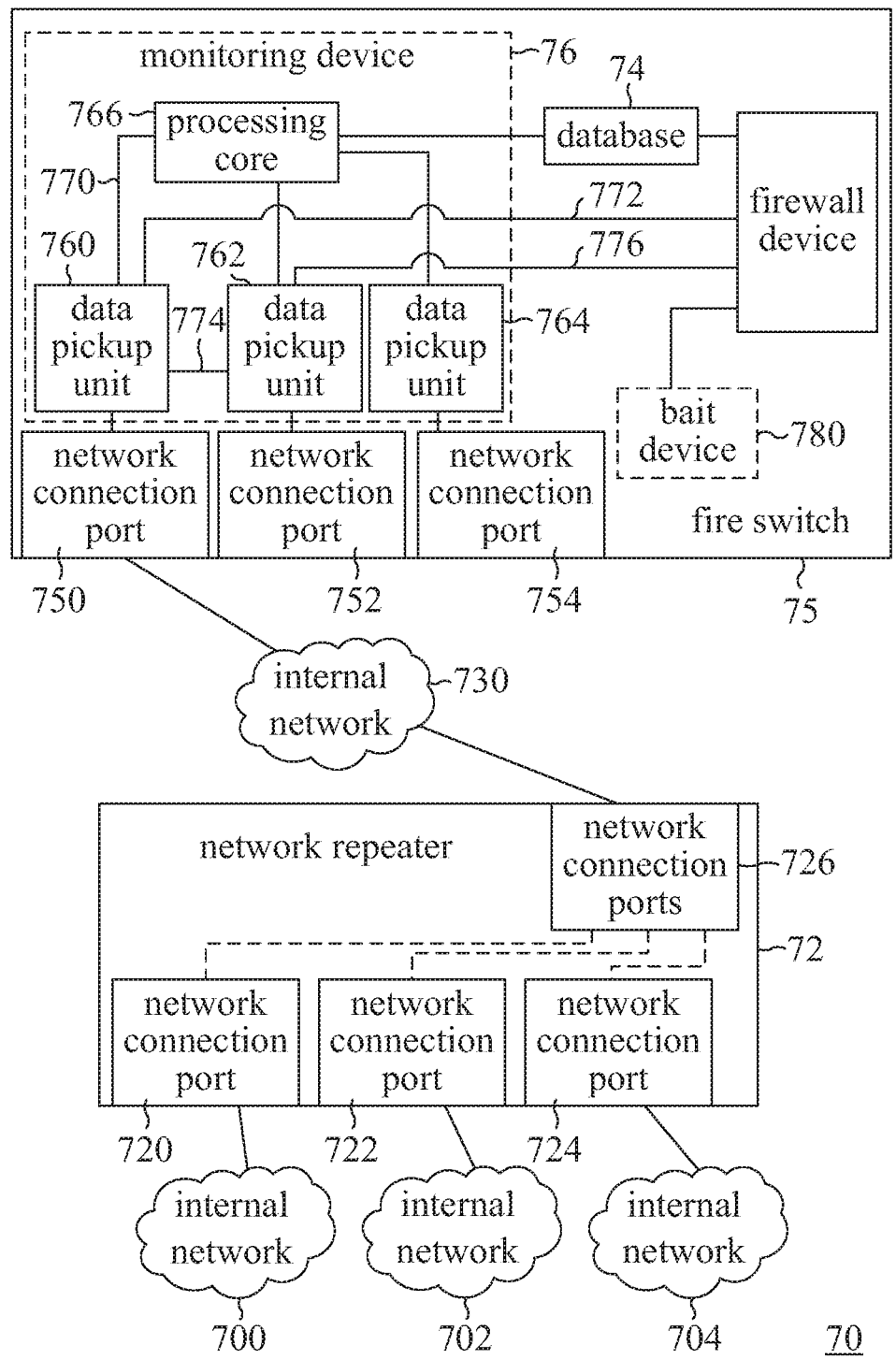
FIG. 7 is a functional block diagram schematically illustrating an internal network monitoring system according to an embodiment of the present invention.

FIG. 7 is a functional block diagram schematically illustrating an internal network monitoring system according to an embodiment of the present invention, to which a plurality of internal networks are interconnected. For example, the internal network monitoring system 70 is connected with internal networks 700, 702, 704 and 730. Each of the internal networks may be a stand-alone machine, or for example, it may be an assembly of computers interconnected through a switch. In this embodiment, the internal network monitoring system 70 includes a network repeater 72 and a fire switch 75, which function as both a firewall and a switch. The network repeater 72 includes a plurality of network connection ports 720, 722 and 724 in communication with the internal networks 700, 702 and 704, respectively, which are referred to third network connection ports, and a network connection port 726 in communication with the internal network 730, which is referred to a second network connection port. As shown, the network connection port 726 is coupled to the network fire switch 75 via the internal network 730. The network packets received by the internal networks 700, 702 and 704 from the network connection ports 720, 722 and 724 can only be transmitted to the internal network 730 and the network fire switch 75 via the network connection port 726. For example, the network packets received by the internal network 700 from the network connection port 720 can only be transmitted to the network fire switch 75 via the network connection port 726 and the internal network 730. It is not allowed to transmit the network packets received by the internal network 700 from the network connection port 720 to other internal networks 702 and 704 via the corresponding network connection ports 722 and 724.

The network fire switch 75 can be implemented with the network fire switch 20 described in any of the preceding embodiments and their proper modifications. In this embodiment, the network connection ports 750, 752 and 754 are electrically connected to data pickup units 760, 762 and 764, respectively. For example, the data pickup unit 760 corresponding to the network connection port 750 temporarily stores the network packet received via the network connection port 750, and the packet characteristic of the network packet is extracted and transmitted to a processing core 766 to be analyzed. Meanwhile, whether the packet characteristic complies with the specific condition or not is determined by the processing core 766. In other words, the processing core 766 and the data pickup units 760, 762 and 764 conduct the monitoring functions of a monitoring device 76.

Assume that the internal network monitoring system receives a network packet, which is scheduled to be transmitted via the network connection port 752. According to the internal network monitoring method illustrated in FIG. 1A, the network packet is first transmitted through the network connection port 750 to the processing core 766 via Path 770 to be analyzed. If it is determined that the network packet needs to be processed by the firewall device 78, the network packet will be transmitted to the firewall device 78 through Path 772 (hereinafter, "first path"). On the other hand, if it is determined that the network packet does not need to be processed by the firewall device 78, it will be transmitted from the network connection port 750 to the originally scheduled network connection port 752 via Path 774 and data pickup unit 762 (hereinafter, "second path"). Furthermore, if the network packet transmitted to the firewall device 78 is then excluded from the alarm list, the network packet will be transmitted via Path 776 to the data pickup unit 762 and return to the second path.

On the other hand, assuming that the internal network monitoring system adopts the internal network monitoring method illustrated in FIG. 1B, the network packet to be transmitted via the network connection port 752 is still transmitted through the network connection port 750 to the processing core 766 via Path 770 to be analyzed first. Afterwards, if the analyzed result shows that the network packet does not need to be processed by the firewall device 78, the network packet will be transmitted to the scheduled network connection port 752 via the second path mentioned above. However, if the analyzed result shows that the network packet needs to be processed by the firewall device 78, the network connection port 750 or the data pickup unit 760 will perform a mirroring operation of the network packet to generate a mirror packet. The mirror packet is then transmitted to the firewall device 78 along the first path mentioned above.

Further designs can be made based on the embodiments described above. For example, once it is determined that the network packet needs to be processed by the firewall device, all the network packets initiated from the source device will be transferred to the firewall device to be processed unless a certain period of time is due, a lifting command is given, or another default condition is satisfied.

Furthermore, all the data acquired by the monitoring device 76 may be stored in the database 74, and optionally accessed by the monitoring device 76 and the firewall device 78 for subsequent operations.

It is to be noted that in the embodiment illustrated in FIG. 7, a bait device 780, e.g. a honey pot, is included in the network fire switch 75 to camouflage an internal network device, and assigned with a network address. The monitoring device 76 determines that the specified network packet complies with the preset condition if a count of network packets to be transmitted from a source device initiating the specified network packet to a destination network address, which is the network address of the bait device 780, reaches a threshold. For example, the network address of the bait device 780 is recorded into the database 74 by the monitoring device 76. Subsequently, whenever the destination network address of a certain network packet is the network address of the bait device 780, and there are repetitive attempts to visit the bait device 780, it should be able to conclude that the source device initiating the network packet has been malicious intruded, so a necessary response should be timely taken.

Depending on practical requirements, one or more bait devices can be provided. In addition, the bait device may be implemented with a virtual device or a container. Furthermore, the bait device may include a deeply inspecting module to initially analyze a network packet in order to exclude the network packet that might unintentionally visit the bait device. In this way, the response time can be reduced and the inspecting speed for discriminating malicious intrusion can be accelerated.

In view of the foregoing, since inspecting contents of Layer 2 of a network packet takes just a little time according to the present invention, the overall time spent for inspecting contents of Layer 2 of all network packets would not be long. Therefore, the influence on the data transmission rate is insignificant. However, once a network packet complying with an alarm condition is found the same type of network packets would be checked carefully to avoid possible adverse effects. In this way, the internal network data can be protected without significantly sacrificing the data transmission rate.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An internal network monitoring method for use with a network fire switch for monitoring an internal network, the network fire switch including a plurality of network connection ports, the method comprising:
    inspecting a specified network packet received from a designated one of the plurality of network connection ports and scheduled to be transmitted to another one of the plurality of network connection ports via a specified path;
    extracting a packet characteristic from a data link layer of the specified network packet;
    directly transmitting the specified network packet to the another one of the plurality of network connection ports via the specified path if the packet characteristic does not comply with a preset condition; and
    redirecting the specified network packet to be transmitted via another path different from the specified path or mirroring the specified network packet to create a mirror packet if the packet characteristic complies with the preset condition.

2. The method according to claim 1, wherein the specified network packet is transmitted via the specified path while the mirror packet is created.

3. The method according to claim 1, wherein the packet characteristic includes a network address of a source device initiating the specified network packet, and the preset condition is that the source device is new to the internal network within a specified period of time.

4. The method according to claim 1, wherein the packet characteristic includes a network address of a source device initiating the specified network packet, and the preset condition is that a count of different destination network addresses that the source device visits within a specified duration reaches a threshold.

5. The method according to claim 1, wherein the packet characteristic includes a network address of a source device initiating the specified network packet, and the preset condition is that a count of different communication interfaces that the source device visits within a specified duration reaches a threshold.

6. The method according to claim 1, wherein the packet characteristic includes a destination network address that the specified network packet is to be transmitted to, and the preset condition is that a count of network packets to be transmitted from the source device to the destination network address reaches a preset value.

7. The method according to claim 1, wherein the packet characteristic includes a destination network address that the specified network packet is to be transmitted to, and the preset condition is that a traffic between the source device and the destination network address reaches a threshold.

8. The method according to claim 1, further comprising:
providing at least one bait device to camouflage an internal network device, and assigning a network address to each of the at least one bait device; and
when a destination network address that the specified network packet is to be transmitted to is the network address of the at least one bait device, increasing a count of network packets to be transmitted from the source device to the destination network address.

9. The method according to claim 8, wherein the at least one bait device is implemented with a virtual device or a container.

10. The method according to claim 8, wherein the at least one bait device includes a deeply inspecting module for analyzing network packets to be transmitted from the source device to the destination network address, which is the network address of the at least one bait device.

11. The method according to claim 1, further comprising:
determining whether the specified network packet or the mirror packet complies with a preset rule; and
issuing an alarm signal, restricting a transmission rate via the specified path and/or interrupting the specified path if the specified network packet or the mirror packet complies with the preset rule.

12. An internal network monitoring system, comprising:
a network fire switch including a plurality of network connection ports, which include a first network connection port, which is designated to receive a specified network packet transmitted from a first internal network,
wherein in a case that the specified network packet received from the first network connection port is scheduled to be transmitted to another one of the plurality of network connection ports via a specified path, the network fire switch extracts a packet characteristic from a data link layer of the specified network packet; directly transmits the specified network packet to the another one of the plurality of network connection ports via the specified path if the packet characteristic does not comply with a preset condition; and redirects the specified network packet to be transmitted via another path different from the specified path or mirroring the specified network packet to create a mirror packet if the packet characteristic complies with the preset condition.

13. The system according to claim 12, wherein the specified network packet is transmitted via the specified path while the mirror packet is created.

14. The system according to claim 12, further comprising a network repeater, which includes a second network connection port in communication with the first internal network, and a plurality of third network connection ports, each in communication with a second internal network, wherein the specified network packet, if being received from the second internal network via one of the third network connection ports, is transmitted to the first internal network via the second network connection port without being transmitted via the other ones of the third network connection ports.

15. The system according to claim 12, wherein the network fire switch includes:
a monitoring device electrically coupled to the first network connection port, inspecting the specified network packet, extracting the packet characteristic; directly transmitting the specified network packet via the specified path if the packet characteristic does not comply with the preset condition; and redirecting the specified network packet to be transmitted via the another path if the packet characteristic complies with the preset condition; and
a firewall device electrically coupled to the specified path for receiving the specified network packet, determining whether the specified network packet complies with a preset rule or not, and transmitting the specified network packet via still another path back to the specified path if the specified network packet does not comply with the preset rule.

16. The system according to claim 12, wherein the network fire switch includes:
a monitoring device electrically coupled to the first network connection port, inspecting the specified network packet, extracting the packet characteristic; directly transmitting the specified network packet via the specified path if the packet characteristic does not comply with the preset condition; and mirroring the specified network packet to create the mirror packet if the packet characteristic complies with the preset condition; and
a firewall device electrically coupled to the specified path for receiving the mirror packet, determining whether the mirror packet complies with a preset rule or not, and issuing an alarm signal, restricting a transmission rate via the specified path and/or interrupting the specified path if the specified network packet complies with the preset rule.

17. The system according to claim 16, wherein the network fire switch further includes at least one bait device, which camouflages an internal network device and is assigned with a network address, and the monitoring device records the network address of the at least one bait device, and determines that the specified network packet complies with the preset condition if a count of network packets to be transmitted from a source device initiating the specified network packet to a destination network address, which is the network address of the at least one bait device, reaches a threshold.

18. The system according to claim 15, wherein the network fire switch further includes at least one bait device, which camouflages an internal network device and is assigned with a network address, and the monitoring device records the network address of the at least one bait device, and determines that the specified network packet complies with the preset condition if a count of network packets to be transmitted from a source device initiating the specified network packet to a destination network address, which is the network address of the at least one bait device, reaches a threshold.

* * * * *